US007003559B1

(12) United States Patent
Nataraian et al.

(10) Patent No.: US 7,003,559 B1
(45) Date of Patent: Feb. 21, 2006

(54) SYSTEM AND METHOD FOR DETERMINING PROBABLE NETWORK PATHS BETWEEN NODES IN A NETWORK TOPOLOGY

(75) Inventors: Srikanth Nataraian, Fort Collins, CO (US); Darren D. Smith, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 690 days.

(21) Appl. No.: 09/694,843

(22) Filed: Oct. 23, 2000

(51) Int. Cl.
*G06F 15/173* (2006.01)
(52) U.S. Cl. .................................. 709/223; 370/357
(58) Field of Classification Search .............. 709/223, 709/224, 238; 703/21; 370/357
See application file for complete search history.

(56) References Cited

U.S. PATENT DOCUMENTS

| 5,049,873 | A | 9/1991 | Robins et al. ......... 340/825.06 |
| 5,063,523 | A | 11/1991 | Vrenjak ....................... 364/614 |
| 5,123,098 | A | 6/1992 | Gunning et al. ............. 395/400 |
| 5,136,690 | A | 8/1992 | Becker et al. ............... 395/161 |
| 5,185,860 | A | 2/1993 | Wu .............................. 395/200 |
| 5,276,789 | A | 1/1994 | Besaw et al. ................ 395/140 |
| 5,414,812 | A | 5/1995 | Filip et al. ................... 395/200 |
| 5,453,980 | A | 9/1995 | Van Engelshoven ....... 370/60.1 |
| 5,455,952 | A | 10/1995 | Gjovaag ....................... 395/700 |
| 5,463,628 | A | 10/1995 | Sorensen .................. 370/110.1 |
| 5,473,608 | A | 12/1995 | Gagne et al. ............. 370/85.13 |
| 5,488,715 | A | 1/1996 | Wainwright ............ 395/182.02 |
| 5,491,796 | A | 2/1996 | Wanderer et al. ....... 395/200.09 |
| 5,509,123 | A | 4/1996 | Dobbins et al. ......... 395/200.15 |
| 5,539,886 | A | 7/1996 | Aldred et al. ........... 395/200.04 |
| 5,561,769 | A | 10/1996 | Kumar et al. ........... 395/200.05 |
| 5,568,605 | A | 10/1996 | Clouston et al. ........ 395/182.02 |
| 5,651,006 | A | 7/1997 | Fujino et al. ................ 370/408 |
| 5,655,081 | A | 8/1997 | Bonnell et al. ......... 395/200.32 |
| 5,689,645 | A | 11/1997 | Schettler et al. ......... 395/200.1 |
| 5,706,508 | A | 1/1998 | Chen et al. .................. 395/616 |
| 5,758,083 | A | 5/1998 | Singh ...................... 395/200.53 |
| 5,774,669 | A | 6/1998 | George et al. .......... 395/200.54 |
| 5,848,243 | A | * 12/1998 | Kulkarni et al. ............. 709/224 |
| 5,910,803 | A | * 6/1999 | Grau et al. ................... 345/734 |
| 5,926,463 | A | * 7/1999 | Ahearn et al. ............... 370/254 |
| 5,960,439 | A | * 9/1999 | Hamner et al. .......... 707/103 R |
| 6,018,344 | A | * 1/2000 | Harada et al. ............... 345/818 |
| 6,208,977 | B1 | * 3/2001 | Hernandez et al. ........... 705/34 |

(Continued)

FOREIGN PATENT DOCUMENTS

EP 0568477 A2 3/1993

(Continued)

OTHER PUBLICATIONS

McClure, "Netsys Service-Level Management Suite 4.0," Feb. 2, 1998, InfoWorld, vol. 2, Issue 5, pp. S9ff.*

(Continued)

*Primary Examiner*—Marc D. Thompson
*Assistant Examiner*—Sean Reilly

(57) ABSTRACT

A preferred system includes a processor, a discovery mechanism and a layout mechanism. The discovery mechanism is configured to generate and store topology data specifying connectors and segments of a communication network. The layout mechanism, which interfaces with the discovery mechanism, is configured to receive topology data from the discovery mechanism and drive a display based upon the topology data. Additionally, the discovery mechanism is configured to determine a path between a start node and an end node based upon the topology data. For instance, such a path(s) may be based upon information corresponding to a type of path of interest and/or information corresponding to a type of connector of interest. Methods and computer readable media also are provided.

8 Claims, 6 Drawing Sheets

U.S. PATENT DOCUMENTS

| | | | |
|---|---|---|---|
| 6,225,999 B1 * | 5/2001 | Jain et al. | 345/734 |
| 6,253,240 B1 * | 6/2001 | Axberg et al. | 709/223 |
| 6,256,295 B1 * | 7/2001 | Callon | 370/254 |
| 6,314,093 B1 * | 11/2001 | Mann et al. | 370/351 |
| 6,370,119 B1 * | 4/2002 | Basso et al. | 370/252 |
| 6,377,987 B1 * | 4/2002 | Kracht | 709/220 |
| 6,396,810 B1 * | 5/2002 | Hebel | 370/248 |
| 6,411,946 B1 * | 6/2002 | Chaudhuri | 706/21 |
| 6,456,306 B1 * | 9/2002 | Chin et al. | 715/810 |
| 6,574,663 B1 * | 6/2003 | Bakshi et al. | 709/223 |
| 6,639,900 B1 * | 10/2003 | Anstey et al. | 370/254 |
| 6,775,243 B1 * | 8/2004 | Valentine et al. | 370/255 |
| 6,842,425 B1 * | 1/2005 | Mannepalli et al. | 370/238 |

FOREIGN PATENT DOCUMENTS

| | | |
|---|---|---|
| EP | 0637152 A1 | 1/1995 |
| EP | 0926919 A2 | 6/1999 |
| WO | WO96/13108 | 5/1996 |

OTHER PUBLICATIONS

Business Wire, "HP Announces Policy-Based Network-Management Solution and New Version of HP OpenView Network Nod Manager," Apr. 13, 1999, Business Wire, pp. 1ff.*

Lee et al., "Distributed Routing Using Topology Database in Large Computer Networks," Mar. 1988, INFOCOM '88, Networks Evolution or Revolution?, pp. 593-602.*

* cited by examiner

SYSTEM AND METHOD FOR DETERMINING PROBABLE NETWORK PATHS BETWEEN NODES IN A NETWORK TOPOLOGY

BACKGROUND OF THE INVENTION

1. Field of the Invention

The present invention generally relates to data communication networks and, more particularly, to systems and methods for determining the probable network path or paths between two nodes in a network topology.

2. Description of the Related Art

A data communications network generally includes a group of devices, such as computers, repeaters, bridges, switches, routers, etc., situated at network nodes and a collection of communication channels for interconnecting the various nodes. Hardware and software associated with the network and, particularly, the devices permit the devices to exchange data electronically via the communication channels.

The size of networks varies. A local area network (LAN) is a network of devices in close proximity, typically less then one mile, and usually connected by a single cable, for instance, a coaxial cable. A wide area network (WAN) is a network of devices which are separated by longer distances, often connected by, for example, telephone lines or satellite links. In fact, some WANs span the U.S. as well as the world. Furthermore, many of these networks are widely available for use by the public, including universities and commercial industries.

A very popular industry standard protocol for data communication along the networks is the Internet Protocol (IP). In time, the Transmission Control Protocol (TCP) and the Unreliable Datagram Protocol (UDP) were developed for use with the IP. The former protocol (TCP/IP) is a protocol which guarantees transfer of data without errors, as it implements certain check functionality, and the latter protocol (UDP/IP) is a protocol which does not guarantee transfer of data, but requires must much less overhead than the TCP/IP platform. Furthermore, in order to keep track of and manage the various devices situated on a network, the simple network management protocol (SNMP) was eventually developed for use with the UDP/IP platform. The use of the foregoing protocols has become extensive in the industry, and numerous venders manufacture many types of networks devices which can employ these protocols.

Many management software packages ("management platforms") are presently available for implementing "management stations" on a network and particularly in connection with the SNMP. Examples of commercially available SNMP management software packages include OpenView from the Hewlett-Packard Company, NetView/6000 from IBM Corp., Spectrum from Cabletron Systems, Inc., Netlabs/Manager from Netlabs, Inc., and SunNet Manager from Sun Connect, Inc. The nodes on a network and their interconnections, oftentimes referred to as a network "topology," are best displayed in a graphical format and most, if not all, of the available management packages provide for this feature. Typically, with these packages, a network can be viewed from different vantage points, depending on the scope of the view desired. For example, one view of the network could be a very wide encompassing view of all nodes on the entire network. A second view could be a view of those portions of a network within a local range, for example, within a particular site or building. A third view of a network, often called a segment, could be a view of the nodes attached to a particular LAN cable.

Hewlett-Packard's very successful OpenView has been the subject of several patents, including, for instance, U.S. Pat. No. 5,185,860, issued to J. C. Wu on Feb. 9, 1993, and U.S. Pat. No. 5,276,789, issued to Besaw et al. on Jan. 4, 1994, the disclosures of which are incorporated herein by reference. U.S. Pat. No. 5,185,860 describes an automatic discovery system for a management station for determining the network devices and interconnections of a network, or the topology. U.S. Pat. No. 5,276,789 describes a graphic display system for a management station for graphically displaying the topology of a network and provides for various views, including, Internet, segment, and node views, that can be requested by a user.

When utilizing a management station, such as a station implemented by Hewlett-Packard's OpenView, a user may consider it beneficial to be able to predict the probable path or paths between two nodes in a network. However, heretofore, the ability to determine the probable path or paths between two nodes has not been addressed by available management platforms.

Therefore there is a need for improved systems and methods which address these and other shortcomings of the prior art.

SUMMARY OF THE INVENTION

Briefly stated, the present invention relates to determining the probable network path or paths between two nodes in a network topology. In this regard, embodiments of the present invention may be construed as providing systems for determining paths between a start node and an end node of a communication network. Typically, such a communication network is formed of sub-networks, with each of the sub-networks including one or more connectors and one or more segments. More specifically, the segments interconnect various ones of the connectors, with the start node, which corresponds to one of the connectors, being designated at one end of the path, and the end node, which corresponds to another of the connectors, being designated at the other end of the path.

In a preferred embodiment of the present invention, the system includes a processor, a discovery mechanism and a layout mechanism. The discovery mechanism is configured to generate and store topology data specifying connectors and segments of a communication network. The layout mechanism, which interfaces with the discovery mechanism, is configured to receive topology data from the discovery mechanism and drive a display based upon the topology data. Additionally, the discovery mechanism is configured to determine a path between a start node and an end node based upon the topology data. For instance, such a path(s) may be based upon information corresponding to a type of path of interest and/or information corresponding to a type of connector of interest.

Some embodiments of the present invention may be construed as providing methods for determining paths between a start node and an end node of a communication network. In this regard, a preferred method includes the steps of: receiving information corresponding to the start node and the end node; receiving information corresponding to a type of path of interest; receiving information corresponding to a type of connector of interest; and determining a path between the start node and the end node based upon the type of path of interest and the type of connector of interest.

Other embodiments of the present invention may be construed as providing computer readable media for facilitating a determination of paths between a start node and an end node of a communication network. In this regard, a preferred computer readable medium includes: logic configured to receive information corresponding to the start node and the end node; logic configured to receive information corresponding to a type of path of interest; logic configured to receive information corresponding to a type of connector of interest; and logic configured to determine a path between the start node and the end node based upon the type of path of interest and the type of connector of interest.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

Figure 1:
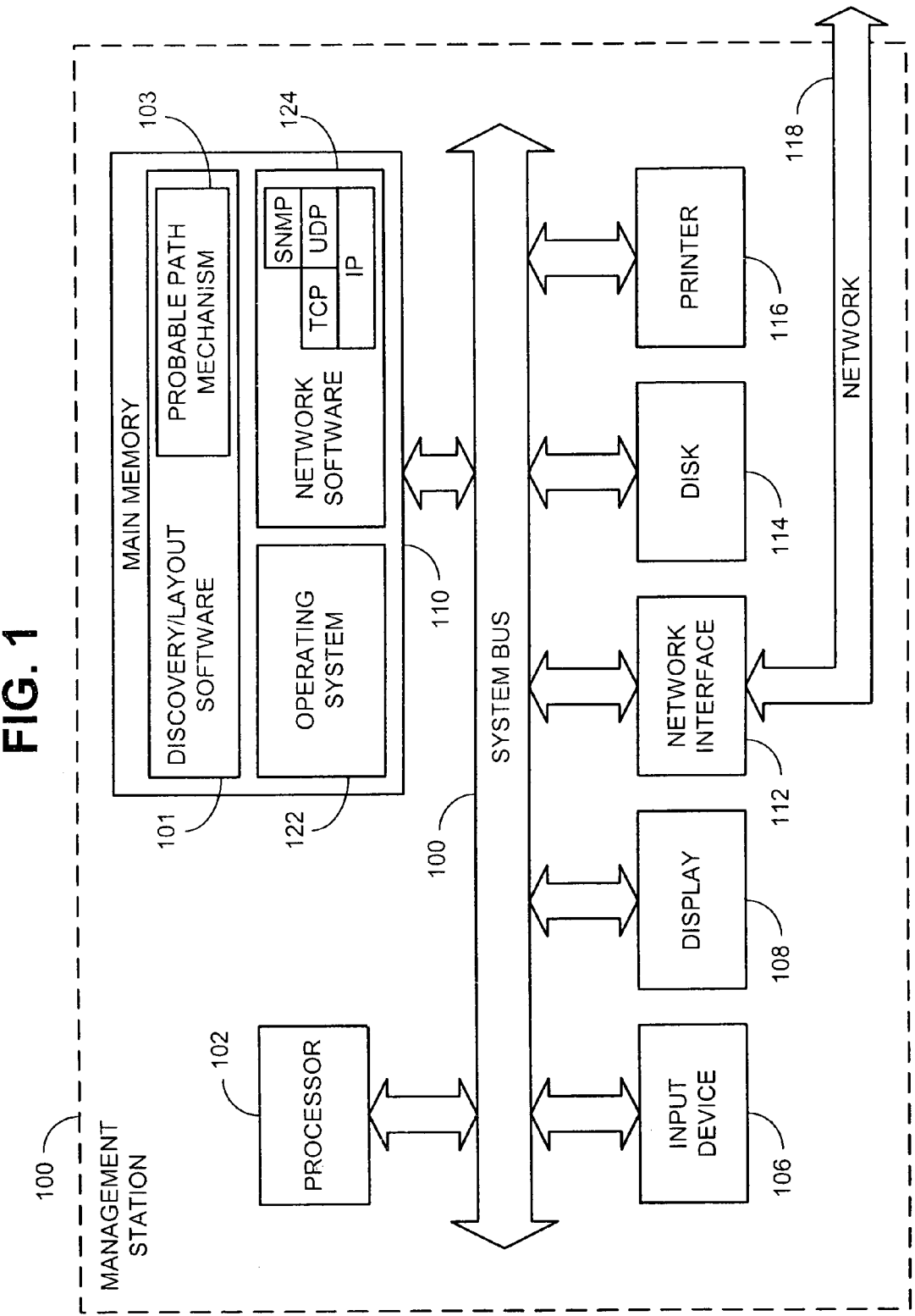
FIG. 1 is a block diagram of a management station including discovery/layout software which employs a preferred embodiment of the system and method of the present invention.

Referring now to the drawings wherein like numerals indicate corresponding parts throughout the several views, FIG. 1 shows a block diagram of an object-oriented management station 100 which is implemented with a general purpose computer system containing novel discovery/layout software 101, which employs a probable path mechanism 103 and associated methodology of the present invention. As shown in FIG. 1, the management system 100 contains a processor 102. The processor 102 communicates with other elements/components within the management station 100 over a system bus 104. An input device 106, for example, a keyboard or mouse, is used to input data from a user of the system 100, and a display 108 is used to output data to the user. A network interface 112 is used to interface the management station 100 to a network 118 in order to allow the management station 100 to act as a node on a network 118. A disk 114, for example, may be used to store the software of the discovery layout software 101 of the present invention, as well as to store the databases (topology and map) generated by the discovery layout software 101. A printer 116 can be used to provide a hard copy output of the nodes of the network 118 discovered by the discovery/layout software 101. A main memory 110 within the management station 100 contains the discovery/layout software 101. The discovery/layout software 101 communicates with a conventional operating system 122 and conventional network software 124 to discover the nodes on the network 118. The network software 124 serves as the intelligence, including validation, for the data communication protocols. As shown in FIG. 1, in the preferred embodiment, the network software implements the IP, the TCP and UDP over the IP, and the SNMP over the UDP. All of the foregoing protocols are well known in the art.

The discovery/layout software 101 implements object-oriented functionality. In the context of SNMP managers, object-oriented means that most of the management system actions and processes that the user can invoke are oriented toward a class of devices rather than individually managed network nodes. Generally, the discovery/layout software 101 of FIG. 1 is configured to discover the network topology, that is, all network node interconnections existing on the network 118, and to construct a map, comprising various sub-maps, any of which can be used for displaying the network topology on the display 108.

Figure 2:
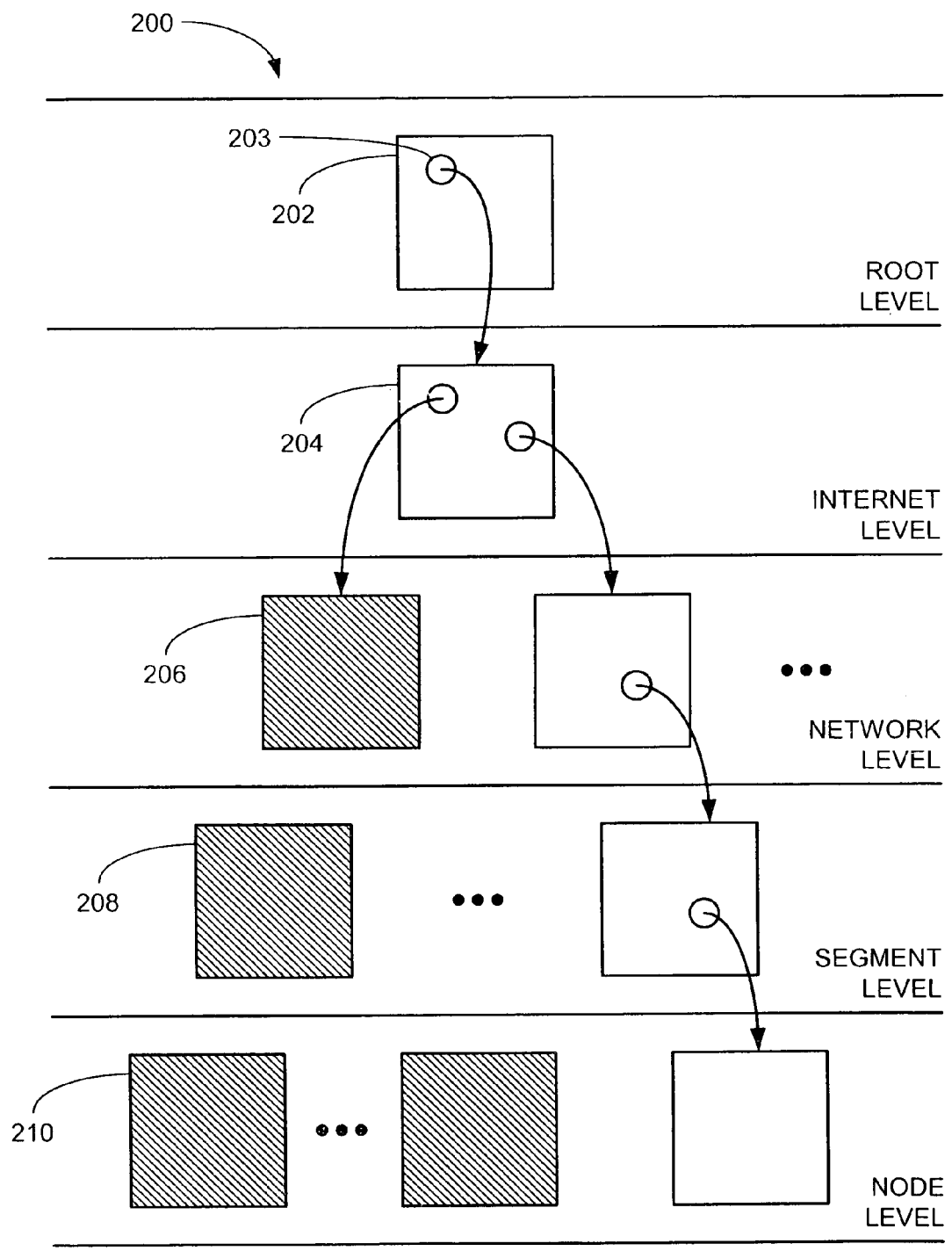
FIG. 2 is a schematic diagram illustrating a display map, which comprises a collection of sub-maps, any of which can be displayed on the display of the management station by the discovery/layout software of FIG. 1.

FIG. 2 shows a map 200 which is generated by the discovery/layout software 101 from topology data discovered from the network 118 (FIG. 1). The discovery/layout software 101 can drive any of the various sub-maps to the display 108 (FIG. 1) for viewing by the user. The sub-maps in the map 200 of FIG. 2 are arranged in a hierarchy. A root sub-map 202 is defined at a root level. The root sub-map 202 represents the highest logical level sub-map in the hierarchy and shows objects 203 as anchor points for different sub-map hierarchies. Each hierarchy is a separate management domain. This could be, for instance, a network, logical grouping of nodes, or some other domain. An Internet sub-map 204 is defined at an Internet level and is generated by exploding an object 203 within the root sub-map 202. "Exploding" in the context in this document means that the user prompts the management station 100 with the input device 106 (FIG. 1) to breakdown and provide more data pertaining to the object 203 at issue. Further, the Internet sub-map 204 illustrates objects 203 in the form of networks and routers. Any one of a number of network sub-maps 206 can be exploded from the Internet sub-map 204. Each network sub-map 206 shows objects 203 in the form of segments and connectors. Any one of a number of segment sub-maps 208 can be exploded from an object 203 within a network sub-map. Each segment sub-map 208 shows objects in the form of network nodes. Finally, any one of a number of node sub-maps 210 can be exploded from an object 203 within a segment sub-map 208. Each node sub-map 210 shows objects 203 in the form of interfaces within that node.

Figure 3:
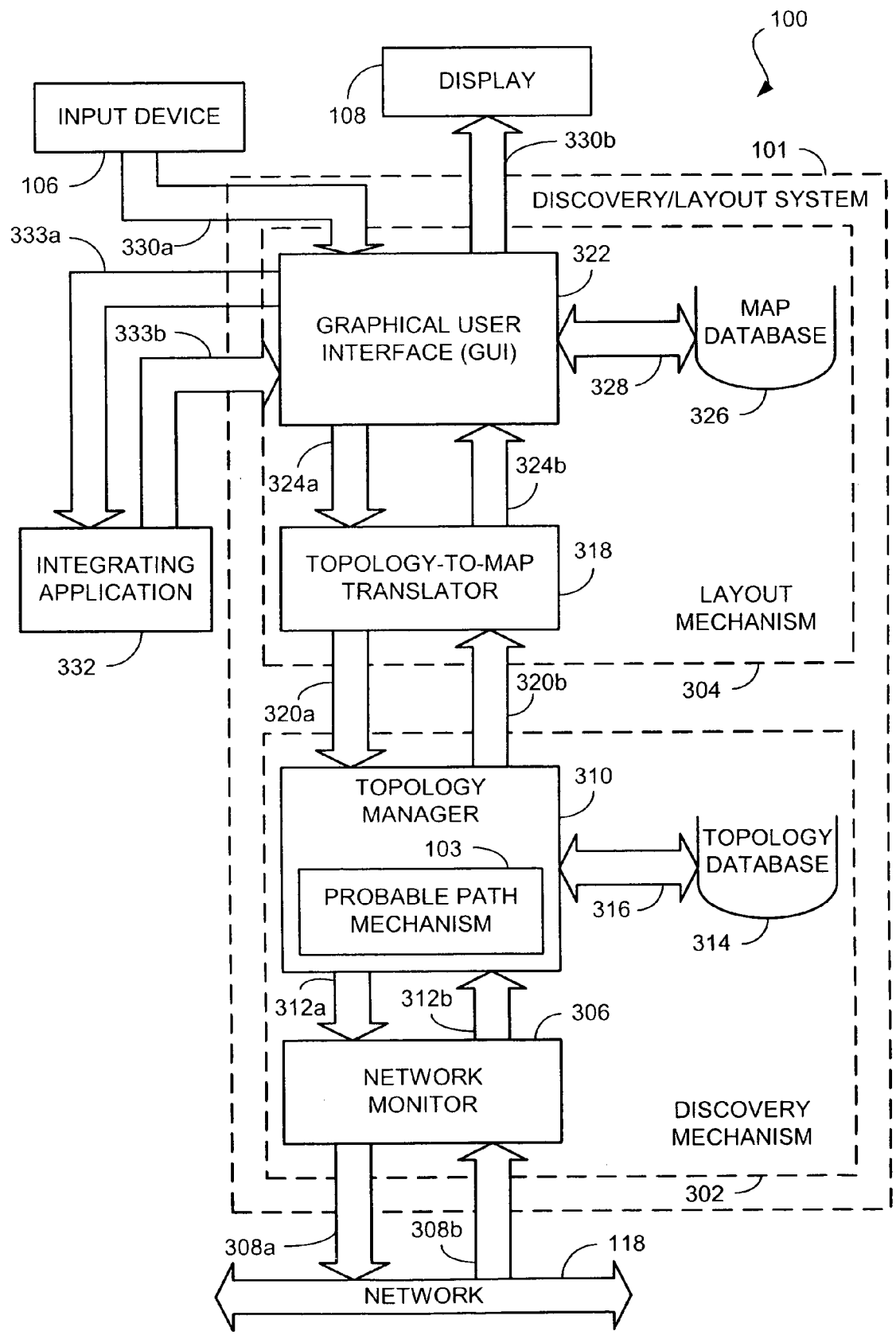
FIG. 3 is a block diagram of the discovery/layout software implementing a preferred embodiment of the present invention.

A high level block diagram of the discovery/layout software 101 (FIG. 1) is set forth in FIG. 3. With the exception of the probable path mechanism 103, the architecture of the discovery/layout software 101 in FIG. 3 is essentially the same as or similar to the architecture of Hewlett-Packard's well known and commercially available management software package called OpenView. As shown in FIG. 3, at a general architecture level, the discovery/layout software 101 comprises a discovery mechanism 302 for discovering nodes and interconnections of the network 118 and a layout mechanism 304 for receiving topology data from the discovery mechanism 302 and for generating the map 200

(FIG. 2) for driving the display 108. Moreover, one or more integrating applications 332 may communicate display and map information with the layout mechanism 304.

The discovery mechanism 302 has a network monitor 306 connected to the network 118 as indicated by connections 308a, 308b, a topology manager 310 connected to the network monitor 306, as indicated by arrows 312a, 312b, and a topology database in communication with the topology manager 310 as indicated by arrow 316. In a preferred embodiment, the probable path mechanism 103 is implemented by the topology manager 310, as described in detail hereinafter.

The network monitor 306 transmits and receives data packets to and from the network 118. The network monitor 386 discovers and monitors network topology, as indicated by arrows 308a, 308b. When network topology changes on the network, the network monitor 306 generates events, or "traps" (SNMP vernacular), which include an object identifier and object change information. The network monitor 306 can also receive events from other devices, such as a router, in the network 118. The network monitor 306 interacts with the network 118 by way of the network software 124 (FIG. 1), which essentially comprises protocol stacks, corresponding to IP, TCP, UDP, SNMP in the preferred embodiment, and which generally implements these protocols and performs validation functions. Furthermore, the network monitor 306 populates the topology database 314 by way of the topology manager 310 and notifies the topology manager 310 of events (topology changes). Finally, it should be noted that U.S. Pat. No. 5,185,860, issued to J. C. Wu, which is incorporated herein by reference, describes a node discovery system which could be employed to implement the network monitor 306 herein.

The topology manger 310, in addition to managing the probable path system and methodology of the present invention, manages the topology database 314, as indicated by bidirectional arrow 316. The topology manager 310 prompts the network monitor 306 to update topology data related to particular events, as indicated by arrow 312a, and receives topology updates, as indicated by 312b.

The topology database 314 stores topology data based upon objects, which are used to partition the network for logical reasons. Objects include, for example, but are not limited to, networks, routers, segments, connectors, nodes, computers, repeaters, bridges, switches, hubs, etc. Moreover, the topology data stored with respect the objects includes, for example, but are not limited to, an interface or device address, an interface or device type, an interface or device manufacturer, and whether an interface or device supports the SNMP.

The layout mechanism 304 has a topology-to-map translator 318 in communication with the topology manger 310 as indicated my arrows 320a, 320b, a graphical user interface (GUI) 322 in communication with the topology-to-map translator 318 as indicated by arrows 324a, 324b, and a map database 326 in communication with the GUI 322 as indicated by bi-directional arrow 328. The integrating application 332 communicates information with the GUI 322, as indicated by arrows 333a, 333b.

It should be noted that the network monitor 306, the topology manager 310, the translator 318, the GUI 322 take turns utilizing the combination of the operating system 122 (FIG. 1) and the processor 102 (FIG. 1) in order to accomplish their respective functions.

The translator 318 converts topology data from the topology database 314 to map data and constructs the various sub maps 202 through 210 in the map 200 of FIG. 2. The translator 318 can forward a request to the topology manager 310, as indicated by arrow 320a, in order to obtain topology data regarding particular objects. Moreover, in addition to forwarding topology data to the translator 318 upon request, the topology manager 310 advises the translator 318, as indicated by the arrow 320b, when topology data has changed based upon an event so that the translator 318 can make any appropriate changes in these submaps.

The GUI 322 manages the map database 326 as indicated by the bi-directional arrow 328, and manages the display 108 and input device 106, as indicated by the arrows 330a, 330b. The GUI 322 receives map updates from the translator 318, as indicated by arrow 324b, and submits user-triggered events to the translator 318, as indicated by arrow 324a. A user-triggered event includes a prompt 330a from a user to explode an object, as described relative to FIG. 2. Finally, it should be noted that U.S. Pat. No. 5,276,789, issued to Besaw et al., which is incorporated herein by reference, describes a graphical user interface which could by employed to implement the GUI 322 herein.

Reference will now be made to the flowchart of FIG. 4 which depicts the functionality of a preferred implementation of the probable path mechanism 103 (FIG. 3) and associated methodology of the present invention. In this regard, each block of this flowchart, as well as other flowcharts depicted herein, represents a module segment or portion of code which comprises one or more executable instructions for implementing the specified logical function or functions. It should also be noted that, in some alternative implementations, the functions noted in the various blocks may occur out of the order depicted in the flowchart(s). For example, two blocks shown in succession in FIG. 4 may, in fact, be executed substantially concurrently where the blocks may sometimes be executed in the reverse order depending upon the functionality involved.

Figure 4:
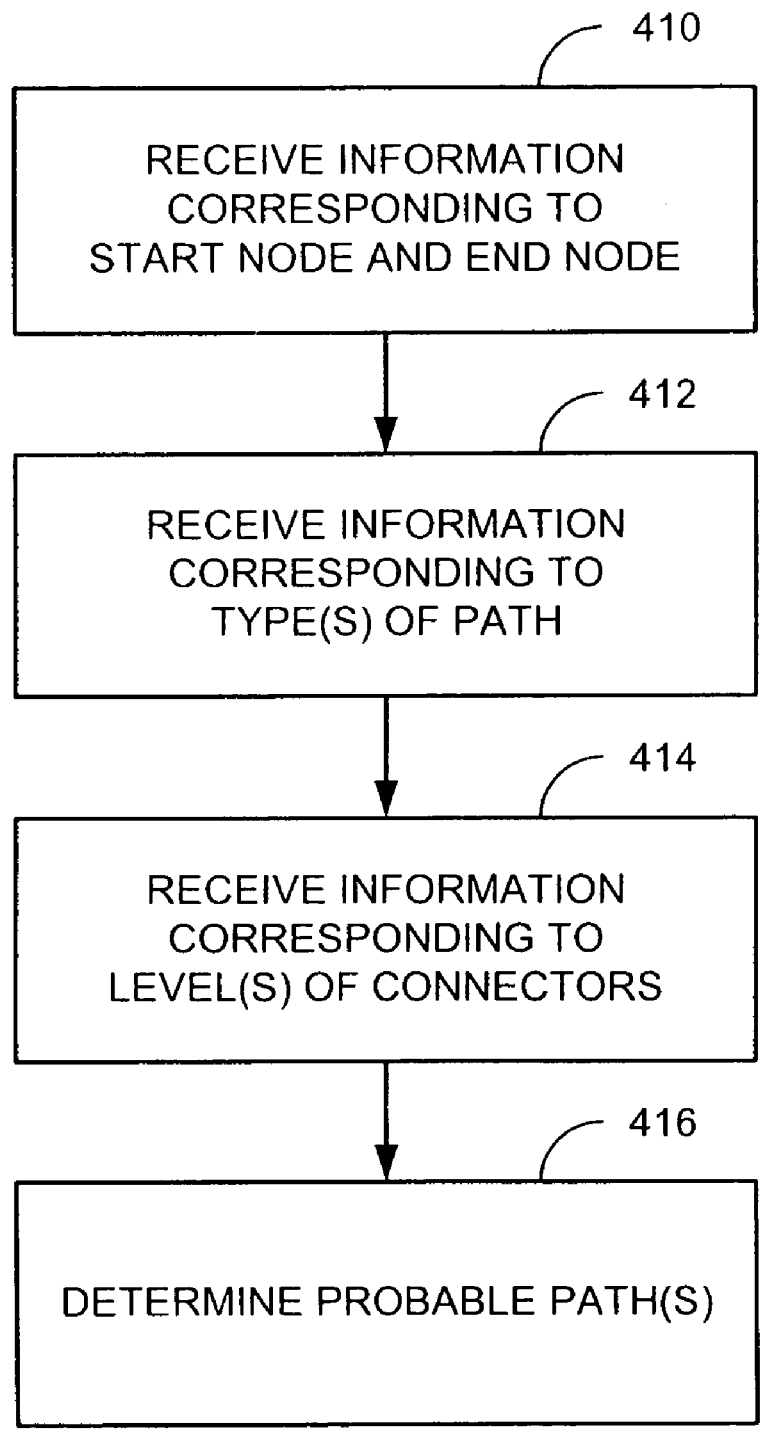
FIG. 4 is a flowchart depicting functionality of a preferred embodiment of the present invention.

As shown in FIG. 4, the preferred functionality depicted may be construed as beginning at block 410 where information corresponding to a start node and an end node of interest may be received. Proceeding then to block 412, information corresponding to a particular path-type of interest may be received. For example, such information may correspond to whether a user is inquiring as to the shortest path and/or all paths between the start node and the end node. Proceeding to block 414, information corresponding to the type(s) of connectors of interest with respect to a given path(s) is received. In particular, such information may correspond to whether layer 2 and layer 3 connectors or, alternatively, only layer 3 connectors are of interest. Thereafter, such as depicted in block 416, the probable path or paths may be determined.

The following definitions are provided for facilitating a more clear understanding of the functionality implemented in the preferred embodiment of the present invention.

"Link"—a connection between an interface on one node and an interface on another node.

"Path"—a conceptual series of links that connect two nodes, e.g., the first interface is on the starting node and the last interface is on the ending node.

"Hop"—a node that serves as the endpoint for a link in the path.

"Hop count"—the number of hops traversed in path, e.g., the first link in a path will have a hop count of zero.

"Shortest path"—a path that traverses the fewest number of hops between the starting node and the ending node.

As mentioned hereinbefore, the present invention may facilitate the determination of probable paths between nodes in a network and may describe the determined path(s) in reference to various types of connectors. More specifically, embodiments of the present invention may define a path as comprising layer 2 and layer 3 connectors or, alternatively, only layer 3 connectors. As utilized herein, a layer 3 (EP layer) connector is defined as a component functioning as a router, i.e., a device that routes data between two or more IP sub-networks (subnets). Additionally, a layer 2 (data link layer) connector is defined as a bridging or switching device which operates within an IP subnet. Thus, when a user requests a probable path determination based upon level 3 connectors only, only connectors operating at level 3 of the network protocol stack will be utilized during path determination. Likewise, when the user requests a probable path determination based upon level 2 connectors and level 3 connectors, connectors operating at both level 2 and level 3 of the network protocol stack will be considered during path determination.

Figure 5:
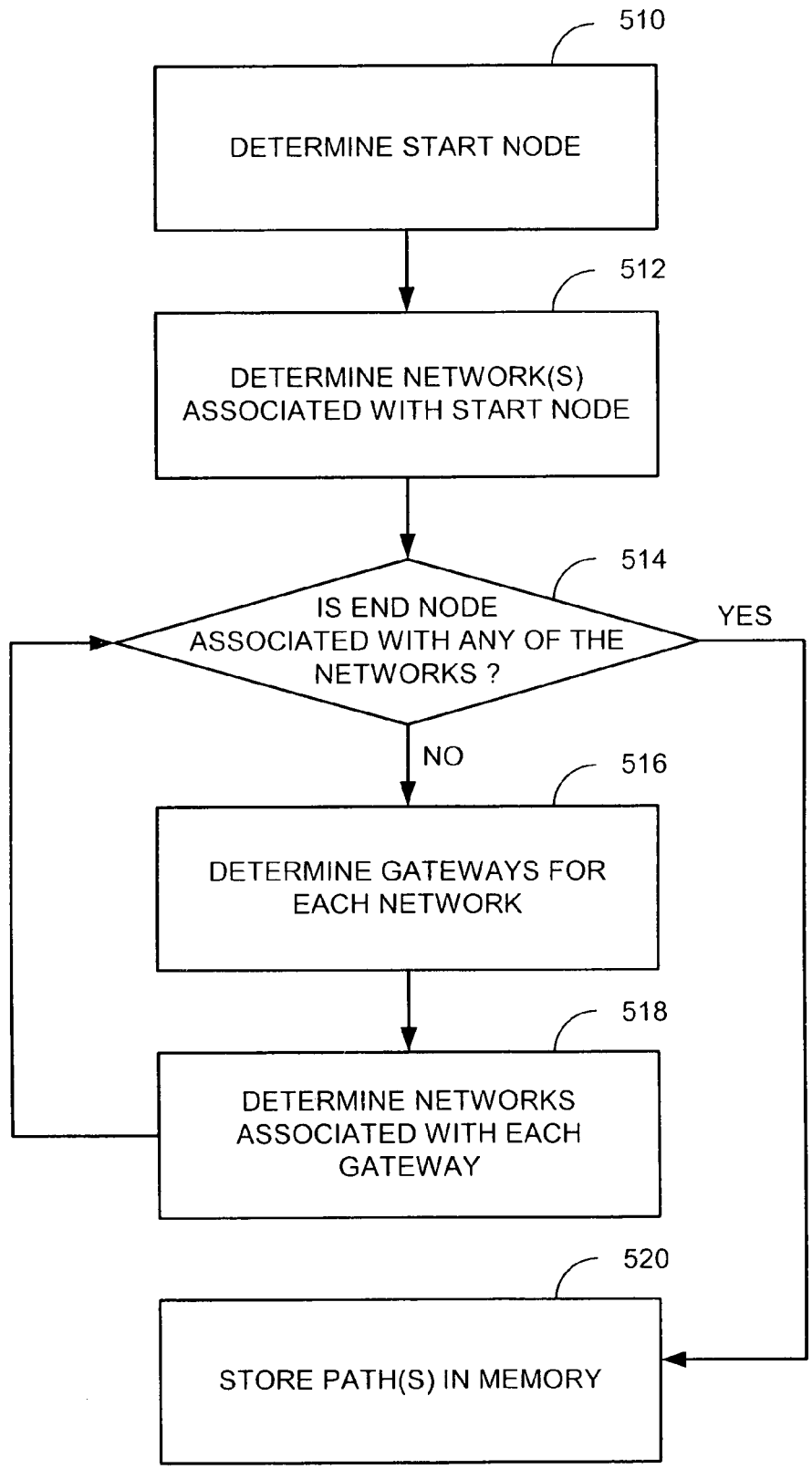
FIG. 5 is a flowchart depicting functionality of a preferred embodiment of the present invention.

In regard to determining a path or paths that include only level 3 connectors, reference will now be made to the flowchart depicted in FIG. 5 which depicts the functionality of a preferred embodiment of the present invention. As shown in FIG. 5, the functionality represented may be construed as beginning at block 510 where the start node is determined. Determination of the start node may be based upon a designation of a start node by a user. Proceeding to block 512, a determination is made as to what networks communicate with the starting node. Then, as depicted in block 514, each network communicating with the starting node is then evaluated to determine whether the end node, which also may be designated by the user, is associated therewith. In order to promote efficiency during the path determination process, one or more process refinements may be employed. For example, if one of the networks is determined to be an IPX network, that network may be discarded, e.g., appropriately marked so as not to be later utilized during the path determination process. Additionally, if a network has previously been visited, further processing of that network may be avoided, such as by marking that network as "visited."

If it was previously determined, such as in block 514, that the end node is not associated with any of the currently identified networks, the process may proceed to block 516 where identification of a gateway(s) of the identified networks is facilitated. As utilized herein, a gateway is a level 3 connector. For those embodiments incorporating the aforementioned process refinements, it may be assumed that identification of a gateway(s) of a network only is facilitated if the network has not been previously visited and is not an IPX network Thus, when a gateway is identified, a network associated with the gateway also may be identified, such as depicted in block 518. Steps 514–518 then may be recursively repeated until one or more paths between the start node and the end node are determined.

When a path between the start node and the end node has been determined during processing, the path may be saved in memory (depicted in block 520). Thus, if a user inquired as to all probable paths between the start node and the end node, each determined path may be saved in memory. Alternatively, if the user inquired as to the shortest path between the start node and the end node, preferably, only the shortest path currently identified by the system during processing is saved in memory. More specifically, if a current shortest path has been previously stored in memory, only information corresponding to a later determined shortest path need be saved in memory, such as by replacing the previous current shortest path. By so doing, an efficient allocation of memory may be achieved.

For ease of description and not for the purpose of limitation, the following segments of pseudo code are provided as representative examples for implementing the above-described functionality.

```
ComputePaths (currentPath, enteringViaNetwork, startingNode,
    endingNode, hopCount, currentShortestHopCount, allPathsOrShortestPath,
    outputPathList, failedIfsList, loopedOrNot, loopedNodesList,
    currentPathNodesList)
{
    If (allPathsOrShortestPath == SHORTEST_PATH &&
    currentShortestHopCount <= hopCount)
        return FALSE
    add the startingNode to the currentPathNodesList // Useful during loop
checking
    Create a currentLink with dummy starting and ending interfaces
    Append this link to the outputPath
    Mark startingNode as visited
    Increment hopCount by 1
    Get all the interfaces on this node
    For every interface on this node
    {
        if this interface is marked "not to be searched from"
            continue
        get the network to which this interface belongs
        if the network is marked visited then
            continue
        if transitioning to an IPX network then
            continue
        mark this network as visited
        Set this interface as the starting interface of the currentLink
        Check if any of the endingNode's interfaces is on this network
        If yes then
        {
            Set that interface as the ending interface of the current link
            If all paths were requested then
                Add this path to the outputPathList
                If total number of paths has reached a maximum
                break
            Else
                Replace the current shortest path with this one on the
        outputPathList
        }
        else
        {
            for every gateway known as currentGateway connected
        to this network
            {
                If gateway is same as the startingNode then
                    Continue
                If gateway is marked visited then
                {
                    Add this gateway to the loopedNodesList if not
                    already present in that list
                    Continue
                }
                get the interface of the gateway connected to this
                network
                set that as the ending interface of the current link
                // Make the recursive call to ComputeLevel3OnlyPaths
                from the next
                // gateway node
                call ComputeLevel3OnlyPaths( ... ) where ... represents
                all the required parameters
                If allPathsOrShortestPath is ALL PATHS then
                    If maximum paths have been obtained then
                        Break
                }
            }
            Clear the visited flag on this network
            If allPathsOrShortestPath is ALL PATHS then
                If maximum paths have been obtained then
                    Break
            Else
                If a shortest path was found
                    Break
            If we did not loop and nor did our descendant from this node
        and if we did not find a path
            then
```

-continued

```
        Mark this interface of the node as "not to be searched from"
        in the future
            Add this interface to the failedIfsList //This list is used to clear
            this flag in the future on this interface
    }
    Remove the last link from the currentPath
    Clear the visited flag on the startingNode
    Remove this node from the currentPathNodesList
}
```

Figure 6:
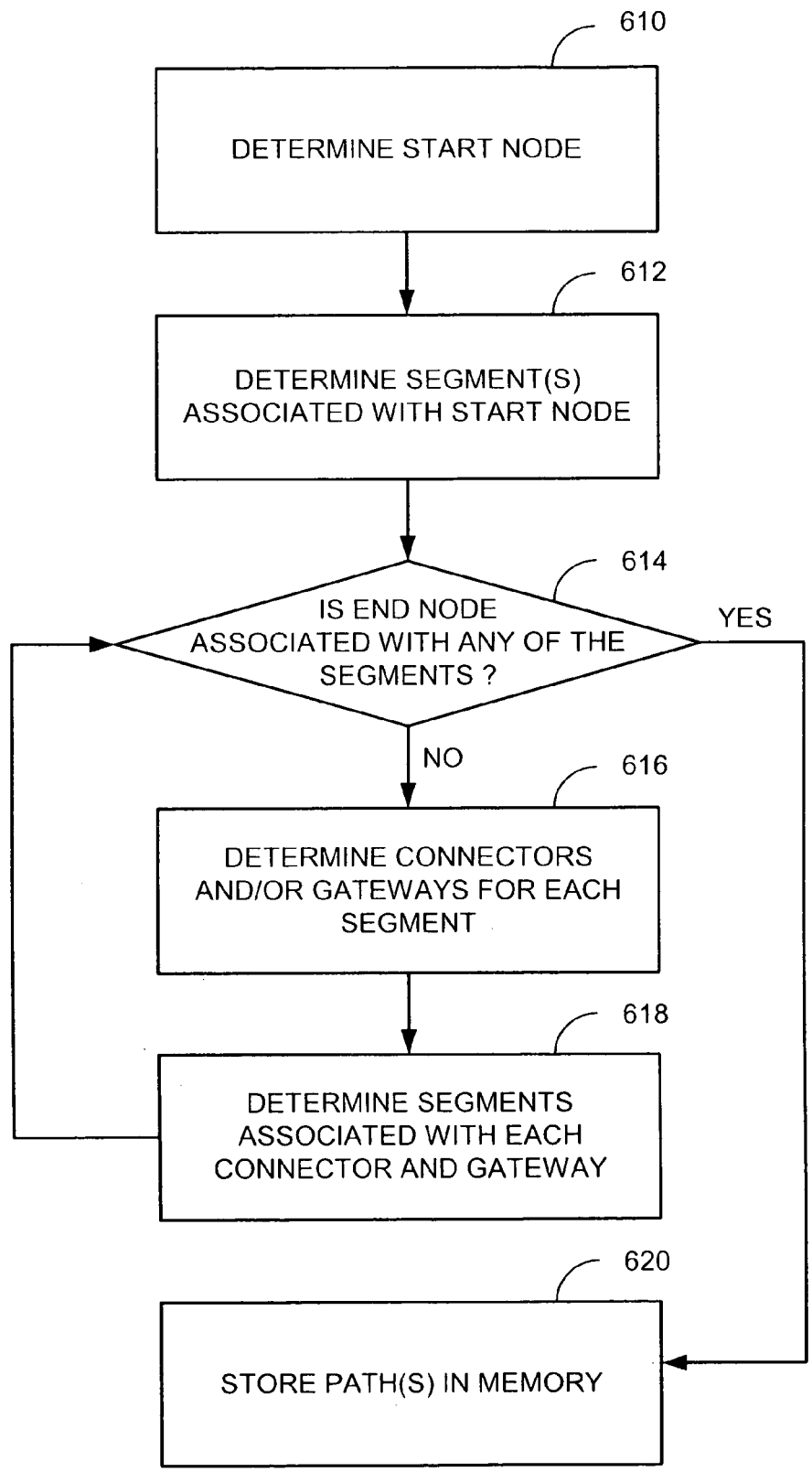
FIG. 6 is a flowchart depicting functionality of a preferred embodiment of the present invention.

In contrast to the determination of paths utilizing only level 3 connectors, the determination of paths that include both level 2 and level 3 connectors is facilitated at the segment level (in contrast to the network level determination previously described). In this regard, reference will now be made to the flowchart of FIG. 6 which depicts the functionality of a preferred embodiment of the present invention. As shown in FIG. 6, the functionality represented may be construed as beginning at block 610 where the start node is determined. Proceeding to block 612, a determination is made as to what segment(s) communicate with the start node. Then, as depicted in block 614, each segment communicating with the start node is then evaluated to determine whether the end node is associated therewith. As described hereinbefore (in regard to the flowchart of FIG. 5), efficiency of the path determination process may be enhanced by one or more process refinements, e.g., disregarding nodes associated with an IPX network, among others.

If it was previously determined, such as in block 614, that the end node is not associated with any of the currently identified segments, the process may proceed to block 616 where identification of connector(s) and/or gateway(s) associated with the identified segments is facilitated—a gateway is a level 3 connector. Then, as depicted in block 618, segments associated with the newly identified connector(s) and/or gateway(s) may be evaluated. Steps 614–618 may be recursively repeated until one or more paths between the start node and the end node are determined. It should be noted that, when transitioning from one segment to another segment during processing, a segment which belongs to another network is not utilized unless the connector associated with that segment is a gateway. This is because level 2 connectors connect segments within a particular subnet and only gateways connect different subnets. Conversely, transitioning between a segment of one network or subnet and a segment of another network or subnet only occurs at a gateway.

When a path between the start node and the end node has been determined during processing, the path may be saved in memory (depicted in block 620). Thus, if a user inquired as to all probable paths between the start node and the end node, each determined path may be saved in memory. Alternatively, if the user inquired as to the shortest path between the start node and the end node, preferably, only the shortest path currently identified by the system during processing is saved in memory, such as described hereinbefore in relation to the flowchart of FIG. 5.

In regard to the computation of paths (paths designated by both layer 2 and layer 3 connectors) the following representative pseudo code is provided for ease of description and not for the purpose of limitation.

ComputePaths (currentPath, enteringViaNetwork, startingNode, endingNode, hopCount, currentShortestHopCount, allPathsOrShortestPath, outputPathList, failedIfsList, loopedOrNot, loopedNodesList, currentPathNodesList)

```
ComputePaths (currentPath, enteringViaNetwork, startingNode,
endingNode, hopCount, currentShortestHopCount,
allPathsOrShortestPath, outputPathList, failedIfsList,
loopedOrNot, loopedNodesList, currentPathNodesList)
{
    If(allPathsOrShortestPath == SHORTEST_PATH &&
        currentShortestHopCount <= hopCount)
        return FALSE
    add the startingNode to the currentPathNodesList // Useful during loop
    checking
    Create a currentLink with dummy starting and ending interfaces
    Append this link to the outputPath
    Mark startingNode as visited
    Increment hopCount by 1
    Get all the interfaces on this node
    For every interface on this node
    {
        if this interface is marked "not to be searched from"
            continue
        get the segment to which this interface belongs
        if the segment is marked visited then
            continue
        if transitioning to an IPX network then
            continue
        if startingNode is not a gateway and if the network to which this
        interface belongs is
        different from the enteringViaNet then
            continue // Can not transition to another network unless device
            is a gateway
        mark the current network as visited
        mark the current segment as visited
        Set this interface as the starting interface of the currentLink
        Check if any of the endingNode's interfaces is on this segment
        If yes then
        {
            Set that interface as the ending interface of the current link
            If all paths were requested then
                Add this path to the outputPathList
                If total number of paths has reached a maximum
                    break
            Else
                Replace the current shortest path with this one on the
                outputPathList
        }
        else
        {
            for every connector known as connector connected to this
            network
            {
                If connector is same as the startingNode then
                    Continue
                If connector is marked visited
                then
                }
                    Mark that we looped here
                    Add connector to the loopedNodesList if not
                    already present
                    in that list
                    Continue
                }
                get the interface of the connector connected to this
                network
                set that as the ending interface of the current link
                // Make the recursive call to ComputePaths from the
                next
                    // gateway node
                    call ComputePaths(...) where ... represents all the
                    required
                    parameters
                    If allPathsOrShortestPath is ALL_PATHS then
                        If maximum paths have been obtained then
                            Break
            }
        }
        Clear the visited flag on this segment
        If startingNode is a gateway then,
            Clear the visited flag on this network
```

-continued

```
If allPathsOrShortestPath is ALL_PATHS then
    If maximum paths have been obtained then
        Break
    Else
        If a shortest path was found
            Break
    If we did not loop and nor did our descendant from this node and
    if we did not find a path
    then
        Mark this interface of the node as "not to be searched from" in
the future
        Add this interface to the failedIfsList //This list is used to clear
        this flag in the future on this interface
    }
    Remove the last link from the currentPath
    Clear the visited flag on the startingNode
    Remove this node from the currentPathNodesList
}
```

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for determining paths between a start node and an end node of a communication network, the communication network being formed of sub-networks, the sub-networks having connectors and segments, the segments interconnecting various ones of the connectors, the start node corresponding to one of the connectors and the end node corresponding to another of the connectors, said method comprising:
   storing, in a topology database, information corresponding to connectors and segments of the communication network;
   receiving, from an operator, information corresponding to the start node and the end node;
   receiving, from the operator, information corresponding to a type of connector of interest; and
   in response to the information received, automatically determining a shortest path between the start node and the end node based upon the type of connector of interest by using only the information stored in the topology database;
   wherein, in determining a shortest path between the start node and the end node, a path with a lowest hop count between the start node and the end node is designated as the shortest path;
   wherein each of the sub-networks has at least one level 2 connector, each of the sub-networks being configured to intercommunicate with another of the sub-networks via a level 3 connector;
   wherein receiving information corresponding to a type of connector of interest comprises receiving information corresponding to at least one of: level 2 and level 3 connectors, and level 3 connectors; and
   wherein, when the type of connectors of interest are level 3 connectors, determining a path between the start node and the end node comprises:
   identifying sub-networks associated with the start node; and
   determining whether the end node is associated with at least one of the identified sub-networks.

2. The method of claim 1, further comprising:
   if the end node is not associated with at least one of the identified sub-networks, recursively identifying sub-networks associated with the each of the previously identified sub-networks; and
   determining whether the end node is associated with at least one of the sub-networks associated with the each of the previously identified sub-networks.

3. The method of claim 1, wherein determining a path between the start node and the end node comprises:
   storing a shortest path between the start node and the end node in memory as a current shortest path; and
   recursively determining paths between the start node and the end node based upon the type of connector of interest such that, when a newly determined path between the start node and the end node is shorter than the current shortest path, the current shortest path is replaced with the newly determined path.

4. A computer readable medium having a computer program for determining paths between a start node and an end node of a communication network, the communication network being formed of sub-networks, the sub-networks having connectors and segments, the segments interconnecting various ones of the connectors, the start node corresponding to one of the connectors and the end node corresponding to another of the connectors, said computer readable medium comprising:
   logic configured to store information corresponding to a topology of the communication network;
   logic configured to receive, from an operator, information corresponding to the start node and the end node;
   logic configured to receive, from the operator, information corresponding to a type of connector of interest; and
   logic configured to determine, automatically and in response to the information received, a shortest probable path between the start node and the end node based upon the type of connector of interest by using only the information corresponding to the topology of the communication network;
   wherein, in determining a shortest path between the start node and the end node, a path with a lowest hop count between the start node and the end node is designated as the shortest path;
   wherein each of the sub-networks has at least one level 2 connector, each of the sub-networks being configured to intercommunicate with another of the sub-networks via a level 3 connector;
   wherein the information corresponding to a type of connector of interest comprises at least one of: level 2 and level 3 connectors, and level 3 connectors; and
   wherein, when the type of connectors of interest are level 3 connectors, the logic configured to determine a path between the start node and the end node is operative to:
   identify sub-networks associated with the start node; and
   determine whether the end node is associated with at least one of the identified sub-networks.

5. The computer readable medium of claim 4, wherein the logic configured to determine a shortest probable path between the start node and the end node comprises:

logic configured to identify segments associated with the start node; and logic configured to determine whether the end node is associated with at least one of the identified segments.

6. A method for determining paths between a start node and an end node of a communication network, the communication network being formed of sub-networks, the sub-networks having connectors and segments, the segments interconnecting various ones of the connectors, the start node corresponding to one of the connectors and the end node corresponding to another of the connectors, said method comprising:

storing, in a topology database, information corresponding to connectors and segments of the communication network;

receiving, from an operator, information corresponding to the start node and the end node;

receiving, from the operator, information corresponding to a type of connector of interest; and in response to the information received, automatically determining a shortest path between the start node and the end node based upon the type of connector of interest by using only the information stored in the topology database;

wherein, in determining a shortest path between the start node and the end node, a path with a lowest hop count between the start node and the end node is designated as the shortest path;

wherein each of the sub-networks has at least one level 2 connector, each of the sub-networks being configured to intercommunicate with another of the sub-networks via a level 3 connector, and wherein receiving information corresponding to a type of connector of interest comprises receiving information corresponding to at least one of: level 2 and level 3 connectors, and level 3 connectors; and wherein, when the type of connectors of interest are level 2 and level 3 connectors, determining a path between the start node and the end node comprises:

identifying segments associated with the start node; and determining whether the end node is associated with at least one of the identified segments.

7. The method of claim 6, further comprising:

if the end node is not associated with at least one of the identified segments, recursively identifying segments associated with the each of the previously identified segments; and determining whether the end node is associated with at least one of the segments associated with the each of the previously identified segments.

8. The method of claim 6, wherein determining a path between the start node and the end node comprises:

storing a shortest path between the start node and the end node in memory as a current shortest path; and recursively determining paths between the start node and the end node based upon the type of connector of interest such that, when a newly determined path between the start node and the end node is shorter than the current shortest path, the current shortest path is replaced with the newly determined path.

* * * * *